No. 879,412. PATENTED FEB. 18, 1908.
J. G. POTTER.
DUMPING CAR.
APPLICATION FILED NOV. 18, 1907.
3 SHEETS—SHEET 2.
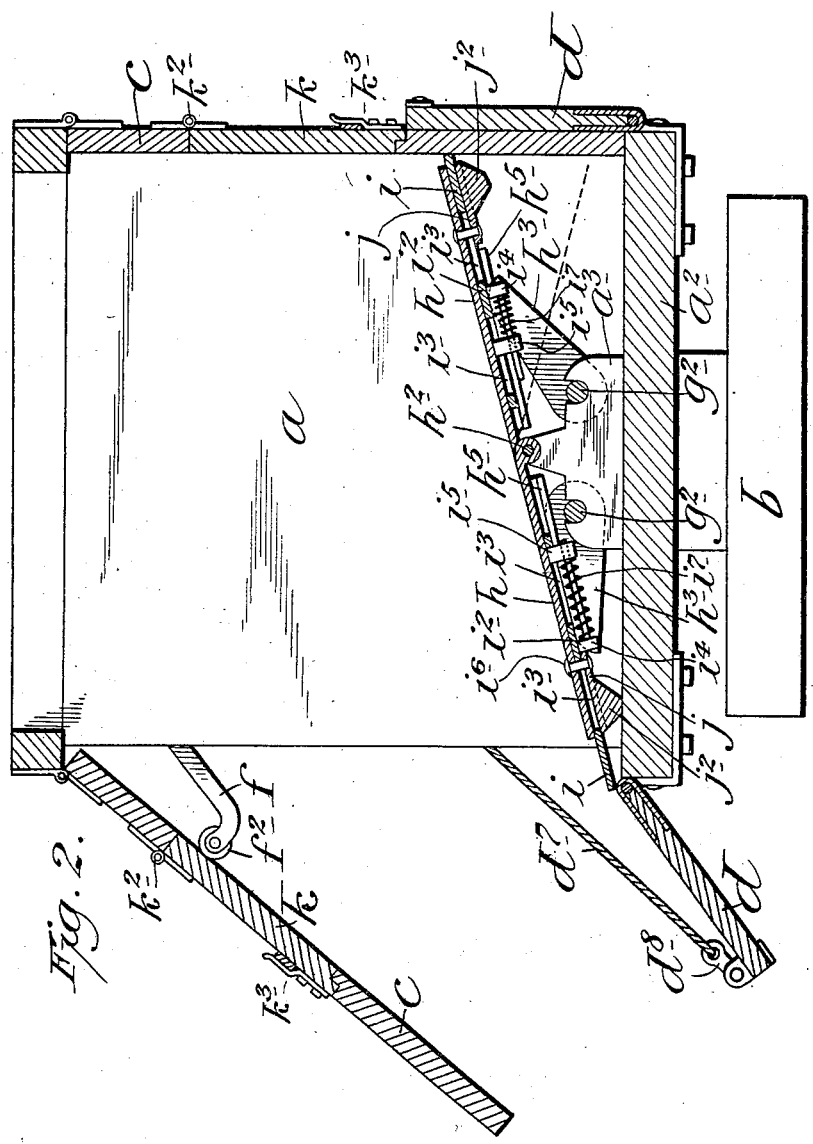
WITNESSES
INVENTOR,
Justus G. Potter,
BY
ATTORNEYS.

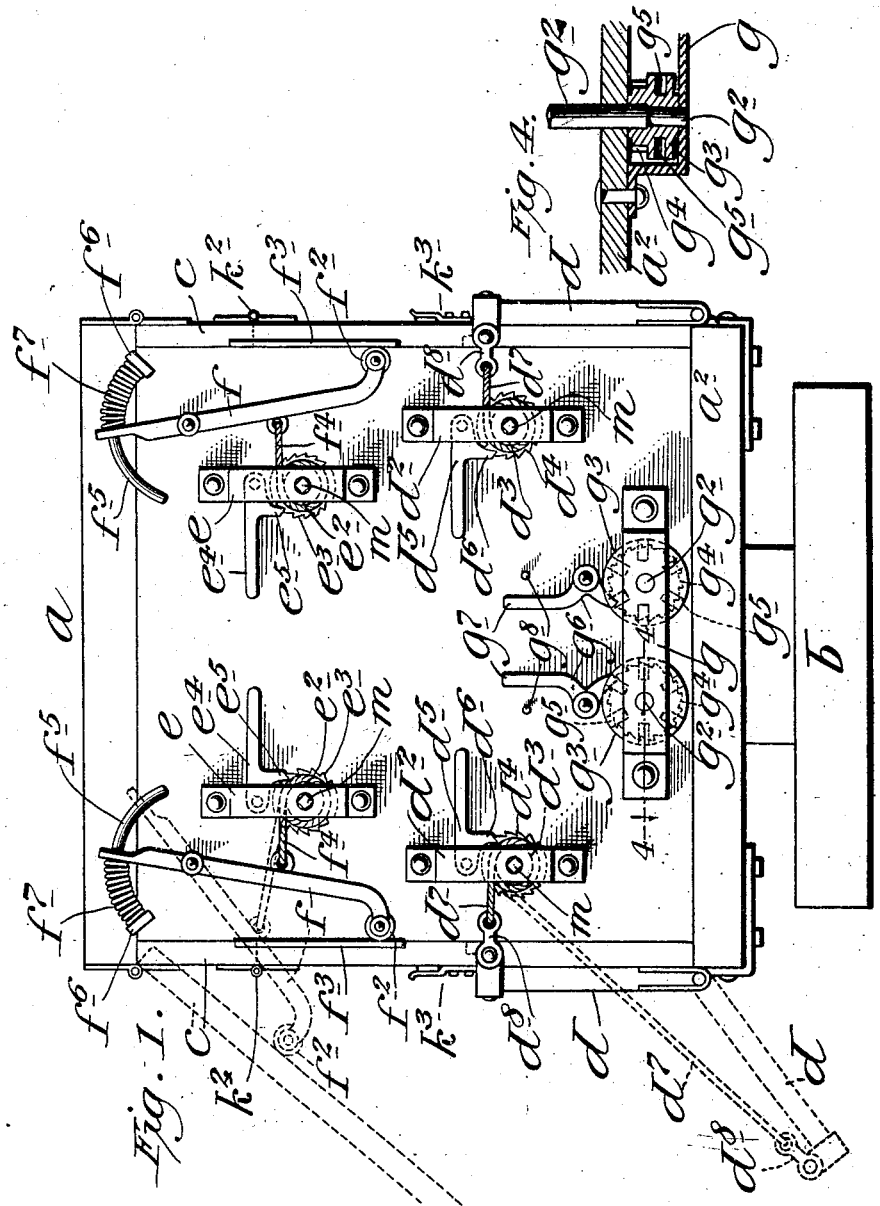

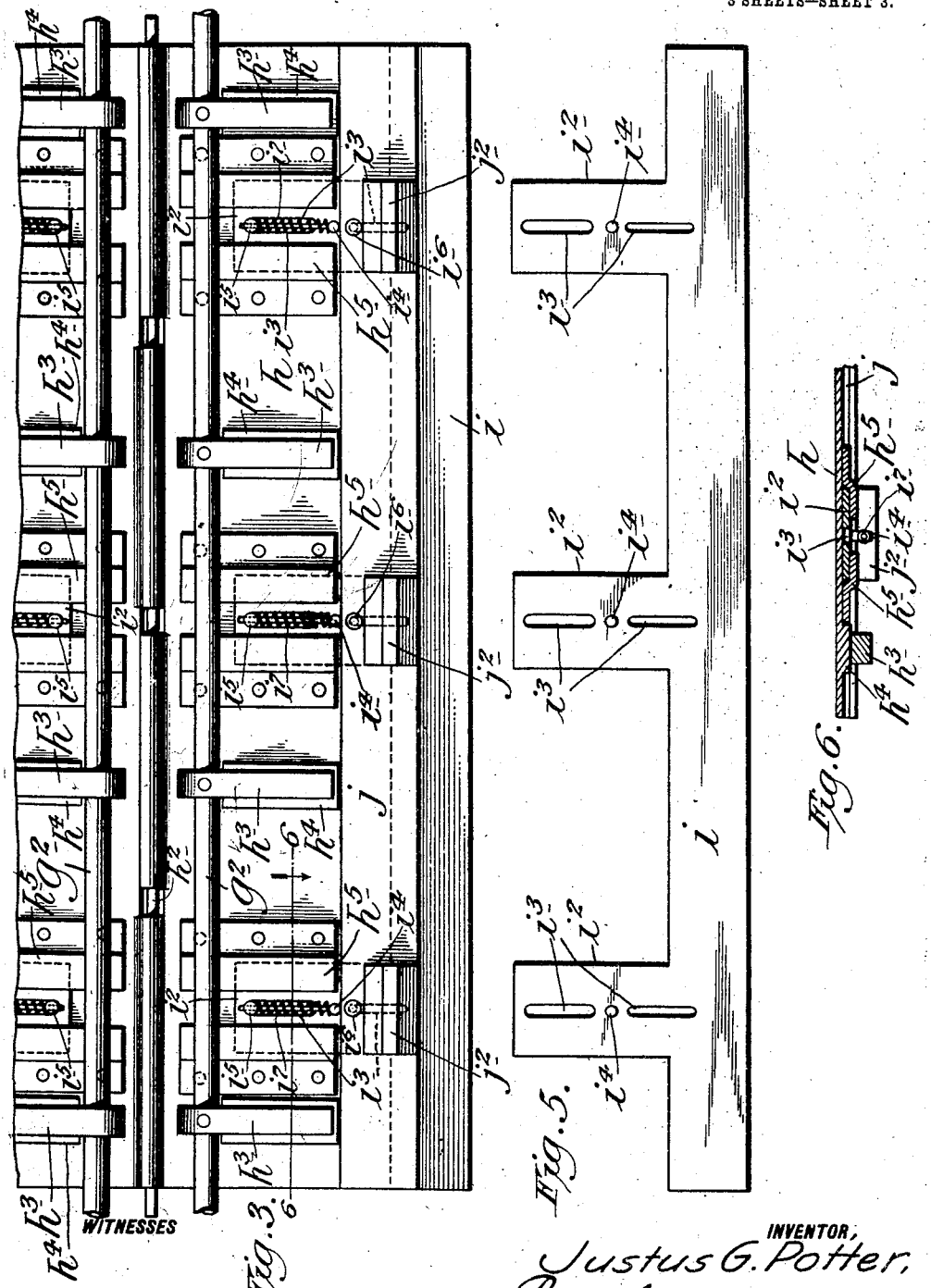

UNITED STATES PATENT OFFICE.

JUSTUS G. POTTER, OF BROOKLYN, NEW YORK.

DUMPING-CAR.

No. 879,412.   Specification of Letters Patent.   Patented Feb. 18, 1908.

Application filed November 18, 1907. Serial No. 402,581.

*To all whom it may concern:*

Be it known that I, JUSTUS G. POTTER, a citizen of the United States, and residing at Cypress Hills, Brooklyn, in the county of Queens and State of New York, have invented certain new and useful Improvements in Dumping-Cars, of which the following is a specification, such as will enable those skilled in the art to which it appertains to make and use the same.

This invention relates to dumping cars for use in hauling or transporting sand, gravel, coal or any other material which it may be desired to unload by dumping; and the object of the invention is to provide an improved car of this class designed to dump its load at the side or sides thereof; and with this object in view, the invention consists in a car of the class specified constructed as hereinafter described and claimed.

The invention is fully disclosed in the following specification, of which the accompanying drawings form a part, in which the separate parts of my improvement are designated by suitable reference characters in each of the views, and in which;—

Figure 1 is an end view of my improved dumping car showing both sides closed in full lines, and one side open in dotted lines, Fig. 2 a transverse section showing one side of the car closed and one side open, Fig. 3 a partial bottom plan view of a false or dumping bottom with which my improved car is provided, Fig. 4 a section on the line 4, 4 of Fig. 1, Fig. 5 a plan view of a detail of the construction shown in Fig. 3, and;—Fig. 6 a section on the line 6, 6 of Fig. 3.

In the drawing forming part of this specification I have shown my invention applied to a car $a$ supported by bolsters or other truck work $b$, but it will be understood that the latter forms no part of the invention. The car $a$ is of the class in which the load is dumped at the sides instead of through the bottom thereof, and in practice the opposite sides of the car are composed of two hinged parts or door members $c$ and $d$, the doors $c$ being hinged at the top of the car and extending when closed to the bottom thereof, and the doors $d$ being hinged at the bottom of the car and extending only part way up when closed, and the doors $d$ when closed overlap the bottom portions of the doors $c$, as clearly shown in Fig. 1, and at the right side of Fig. 2.

At each end of the car and inwardly of the tops of the doors $d$, when the latter are closed, are placed vertically arranged brackets $d^2$ in which are mounted drums $d^3$ provided with ratchets $d^4$, and over each of the ratchets $d^4$ is pivoted a gravity pawl $d^5$ having a nose $d^6$ adapted to operate in connection with the corresponding ratchet $d^2$.

Connected with the drums $d^3$ are cords or cables $d^7$, preferably composed of wire, and these cords or cables $d^7$ are connected with the door members $d$ by pivot or link devices $d^8$. Each end of the car is also provided above the brackets $d^2$ with vertically arranged brackets $e$ which are set inwardly of the brackets $d^2$, and mounted in the brackets $e$ are drums $e^2$ provided with ratchets $e^3$, and pivoted over the ratchets $e^3$ are gravity pawls $e^4$ provided with a nose $e^5$, and the nose $e^5$ of the gravity pawl $e^4$ operate in connection with the ratchets $e^3$.

Pivoted between the top portions of the brackets $e$ and the sides of the car, as shown at $e^6$, are levers $f$ provided at their lower ends with rollers $f^2$ adapted to bear on plates $f^3$ secured to the side door members $c$ and connected with the lever $f$ are cords or cables $f^3$ which are wound on the drums $e^2$, said cords or cables $f^4$ being preferably made of wire.

At the upper outer corners of the ends $a$ of the car are segmental or curved arms $f^5$ which are secured at $f^6$, and these arms pass through the shorter ends of the lever $f$, and between said ends of the lever $f$ and the ends of the arms $f^5$ at $f^6$ are placed spiral springs $f^7$.

At the opposite ends of the car, and at the bottom thereof are placed horizontal brackets $g$, and passed longitudinally through the bottom portion of the car are parallel shafts, $g^2$, and at each end of the car, the shafts $g^2$ are provided with drums $g^3$ provided on their inner sides with ratchets $g^4$, and the drums $g^3$ are provided at their faces with radial sockets or recesses $g^5$ as clearly shown in Fig. 4.

Pivoted to the ends of the car over the ratchets $d^4$ are pawls $g^6$ having noses which operate in connection with the ratchets $g^4$, and said pawls are provided with upwardly directed handles $g^7$, and at the outer sides of said pawls are placed stop pins $g^8$, in the form of construction shown. The shafts $g^2$ are provided within the car with supports or bearings $a^3$, mounted on the bottom $a^2$ of the car, and the car is also provided with false or supplemental inner bottom members $h$ which extend longitudinally of the car, and which are pivoted or hinged at $h^2$ centrally and longitudinally of the car to the supports $a^3$, or to upwardly directed extensions $a^4$, of said supports.

The shafts $g^2$ are provided at intervals with arms $h^3$ which bear on thickened portions or members $h^4$, and secured to the bottom of said inner or false bottom members $h$ are keepers $h^5$ arranged in pairs parallel with the parts $h^3$ and $h^4$.

The inner or false bottom members are provided with slides $i$ which range longitudinally thereof, and are mounted on the bottom thereof, and said slides are provided with inwardly directed members $i^2$, having longitudinally arranged central slots $i^3$ between which are pins $i^4$, and the inwardly directed members $i^2$ of the slides $i$ are passed between the separate pairs of keepers $h^5$, and the inner or false bottom members $f$ are provided with pins $i^5$ which pass outwardly through the inner slots $i^3$, and the said inner or false bottom members $f$ are also provided with pins $i^6$ which pass outwardly through the outer slots $i^3$, and connected with the pins $i^5$ and with the pins $i^4$ are spiral springs $i^7$ which normally serve to force the slides $i$ outwardly, this construction being clearly shown in Figs. 2, 3, 5 and 6.

Secured to the bottom of the outer edge portion of the inner false or supplemental bottom members $h$ are plates $j$ through the inner edge portions of which the pins $i^6$ are passed, and the slides $i$ are mounted between the plates $j$ and the outer edge portions of the inner false or supplemental bottom members $h$, and the said plates $j$ are provided at intervals with thickened blocks or bearings $j^2$ which are adapted, in the lowest position of the parts $h$, to bear on the bottom $a^3$ of the car, as shown at the left in Fig. 2.

Each of the main or upper side door members $c$ is provided, in the form of construction shown, and at any suitable points with a supplemental door or doors $k$ hinged at $k^2$ and provided with bottom fastening devices $k^3$. In Fig. 1 of the drawing the side door members $c$ and $d$ are both shown closed, and the cords or cables $d^7$ and $f^4$ are wound on the drums $d^3$ and $e^2$, and with the parts in this position the car may be filled with any material through the top thereof, or it may be partially filled through the doors $k$, which latter may be closed and the filling process completed through the top of the car.

Suppose the inner false or supplemental bottom members $h$ to be in the position shown in full lines in Fig. 2 when the car is filled. If now it is desired to dump the car through the left hand side, all that is necessary is to release the pawls $d^5$ and $e^4$ at said side when the material within the car will force the left side door members $c$ and $d$ outwardly as shown in dotted lines in Fig. 1, and full lines in Fig. 2, and in this operation the corresponding lever $f$ and spring $j^7$ aid in forcing the door member $c$ outwardly into the position referred to. The inner false or supplemental bottom members $h$ may however, both be in the downwardly and outwardly inclined position, as shown at the left of Fig. 2, in full lines, and at the right in dotted lines, when the car is filled and in this position the material therein may be dumped from both sides of the car, as will be readily understood. The inner false or supplemental bottom members $h$ are raised into the highest position, when desired by bars or similar devices inserted into the sockets or recesses $g^5$ in the drums $g^3$, and the said members $h$ are held in their raised positions by the pawls $g^6$ operating in connection with the ratchets $g^4$. It will also be understood that the door members $c$ and $d$ are held in their closed position by the pawls $e^4$ and $d^5$ operating in connection with the ratchets $e^3$ and $d^4$, and in order to release said door members, the pawls $e^4$ and $d^5$ must be raised, and the door members $c$ and $d$ are swung into the closed position as shown in full lines in Fig. 1, by turning the drums $e^2$ and $d^3$, said operation being accomplished by cranks applied to the shafts $m$, of said drums or in any other desired manner.

If both of the inner or supplemental bottom members $h$ are in their lowest position when the car is filled, the entire contents may be dumped at one side of the car by opening the doors on said side and letting part of the load roll out, after which the inner false or supplemental bottom member $h$ on the opposite side may be raised and the balance of the contents of the car dumped as will be readily understood.

In the movement of the inner false or supplemental bottom members $h$ when the doors $b$ and $c$ are closed, the slides $i$ bear on said doors at all times and the space between the parts $h$ and doors is securely closed.

Having fully described my invention, what I claim as new and desire to secure by Letters Patent, is:—

1. A dumping car provided with hinged side doors and inner supplemental bottom members which range longitudinally of the car and are hinged centrally and longitudinally thereof, said bottom members being provided with slides which are adapted to press against the doors and means for raising and lowering said bottom members and for closing and opening the doors.

2. A dumping car open at both sides and provided with doors which are hinged at the top and extend to the bottom thereof when closed, other doors hinged to the bottom and extending upwardly against the first named doors when closed, and means for opening and closing said doors, said car being also provided with inner supplemental bottom members which range longitudinally thereof and are hinged longitudinally and centrally of the car, and means for raising and lowering said bottom members.

3. A dumping car open at both sides and provided with doors which are hinged at the top and extend to the bottom thereof when closed, other doors hinged to the bottom and extending upwardly against the first named doors when closed, and means for opening and closing said doors, said car being also provided with inner supplemental bottom members which range longitudinally thereof and are hinged longitudinally and centrally of the car, and means for raising and lowering said bottom members, said bottom members being also provided with longitudinal slides which normally bear on the inner top side doors when the latter are closed.

4. A dumping car open at both sides and provided with doors adapted to swing outwardly, and means for opening and closing said doors; said car being also provided with inner false or supplemental bottom members which range longitudinally thereof and which are hinged or pivoted longitudinally and centrally of the car, said bottom members being provided with spring operated slides which normally bear on the doors when the latter are closed, and means for raising and lowering said bottom members and for holding them in any desired position with reference to each other.

5. A dumping car open at both sides and provided with top and bottom doors, the top doors at their outer sides being provided with supplemental doors arranged centrally thereof, means for opening and closing said top and bottom doors and holding the same in a closed position, said car being also provided with inner false supplemental bottom members which are hinged centrally and longitudinally thereof above the main bottom thereof and are normally inclined downwardly and outwardly, and means for raising the outer side edges of said supplemental bottom members and for holding them in a raised position.

6. A dumping car open at both sides and provided with top and bottom doors hinged respectively to the top and bottom of the car, the top doors being provided with supplemental centrally arranged doors, means for opening and closing the top and bottom doors and holding the same in a closed position, said car being also provided with inner false supplemental bottom members which are hinged centrally and longitudinally thereof above the main bottom thereof and which are normally inclined downwardly and outwardly, and means for raising the outer side edges and holding the same in a raised position, said supplemental bottom members being also provided with spring operated slides adapted to normally bear on the bottom doors at the sides of the car when the latter are closed.

In testimony that I claim the foregoing as my invention I have signed my name in presence of the subscribing witnesses this 16th day of November 1907.

JUSTUS G. POTTER.

Witnesses:
C. E. MULREANY,
M. E. DOODY.